Figure 1:
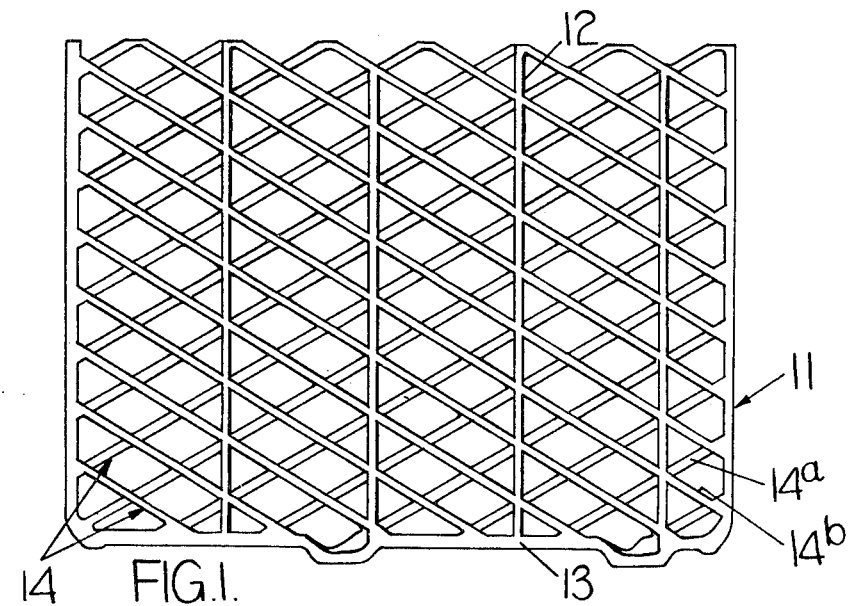

United States Patent [19]

Hammond et al.

[11] 3,909,293

[45] Sept. 30, 1975

[54] METHOD OF MANUFACTURING BATTERY PLATE GRIDS

[75] Inventors: John Edward Hammond; Alan Williams, both of Solihull, England

[73] Assignee: Joseph Lucas (Industries) Limited, Birmingham, England

[22] Filed: July 23, 1973

[21] Appl. No.: 381,586

Related U.S. Application Data

[62] Division of Ser. No. 246,796, April 24, 1972, abandoned.

[30] Foreign Application Priority Data

Apr. 30, 1971 United Kingdom............... 12328/71
Apr. 29, 1971 United Kingdom............... 12301/71

[52] U.S. Cl. ................................. 136/36; 139/425 R
[51] Int. Cl. ............................................ H01m 35/04
[58] Field of Search ................................ 136/36–67; 29/2, 160; 72/178, 364

[56] References Cited
UNITED STATES PATENTS

| | | | |
|---|---|---|---|
| 1,139,469 | 5/1915 | Potter | 139/425 R |
| 2,275,194 | 3/1942 | Sizelove | 136/36 |
| 3,241,227 | 3/1966 | Bergh | 136/36 |
| 3,247,023 | 4/1966 | Geissbauer | 136/40 |
| 3,310,438 | 3/1967 | Huffman et al. | 136/36 |
| 3,458,355 | 7/1969 | Radtke | 136/38 |
| 3,607,411 | 9/1971 | Brownrigg | 136/37 |

*Primary Examiner*—John H. Mack
*Assistant Examiner*—C. F. LeFevour
*Attorney, Agent, or Firm*—Holman & Stern

[57] ABSTRACT

A battery plate grid includes an open, rectangular conductive framework, a conductive battery plate lug integral with the framework, a plurality of parallel ribs extending between a pair of opposite frame members of the grid, and a plurality of strands arranged to define a lattice structure bounded by the framework, the interstices of the lattice structure being arranged to receive the active material of the battery plate. To manufacture the grid, a strip of grid material is blanked to produce a preform grid having the same weight as the finished grid and having a rectangular framework of substantially the same dimensions as that of the finished grid, the preformed grid also including a lattice structure defined by a plurality of strands and arranged so that the dimensions of the lattice structure in a direction perpendicular to the plane of the preformed grid are less than the corresponding dimensions of the lattice structure of the finished grid. After blanking, the strands of the preformed grid are displaced in such a manner as to increase the dimension of the lattice structure in a direction perpendicular to the plane of the grid to the value required in the finished grid.

7 Claims, 5 Drawing Figures

METHOD OF MANUFACTURING BATTERY PLATE GRIDS

This is a division of application Ser. No. 246,796, filed Apr. 24, 1972 now abandoned.

This invention relates to battery plate grids of the kind including an open, rectangular conductive framework, a conductive battery plate lug integral with the framework, a plurality of parallel ribs extending between a pair of opposite frame members of the grid, and a plurality of strands arranged to define a lattice structure bounded by the framework, the interstices of the lattice structure being arranged to receive the active material of the battery plate. The present invention is a Divisional Application from our co-pending U.S. Pat. Application Ser. No. 246796.

In one aspect, the invention resides in a method of manufacturing a battery plate grid of the kind specified including the steps:

a. blanking a strip of grid material to produce a preformed grid having the same weight as the finished grid and having a rectangular framework of substantially the same dimensions as that of the finished grid, the preformed grid also including a lattice structure defined by a plurality of strands and arranged so that the dimensions of the lattice structure in a direction perpendicular to the plane of the preformed grid are less than the corresponding dimensions of the lattice structure of the finished grid, and b. displacing the strands of the preformed grid in such a manner as to increase the dimensions of lattice structure in a direction perpendicular to the plane of the grid to the value required in the finished grid.

Preferably the displacing of the strands is also accompanied by a coining operation to shape the strands to produce keying regions thereon which, in use, serve to facilitate retention of the active material of the battery plate within the interstices of the lattice structure.

Preferably, the coining operation also shapes the ribs of the preformed grid so as to produce keying regions on the ribs.

Conveniently, the grid material which is subjected to the blanking operation is in the form of a plain strip of material, or alternatively is pre-shaped so as to define the ribs and/or one pair of parallel frame members of the preformed grid.

Conveniently, the grid material is dispersion strengthened lead or alternatively is a lead alloy. It is to be appreciated that the term lead alloy is used in this respect to mean any lead alloy used in the manufacture of lead battery plate grids and therefore includes alloys of lead and antimony, and alloys of lead and calcium.

In a further aspect, the invention resides in a battery plate grid manufactured by the method described in the preceding paragraphs.

Figure 2:
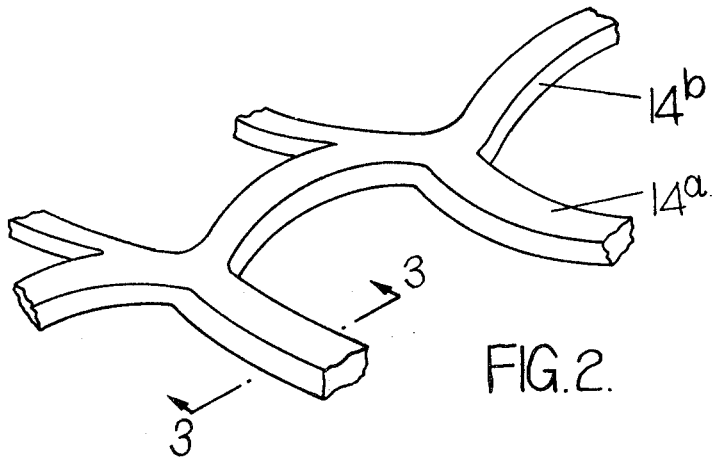
Figure 3:
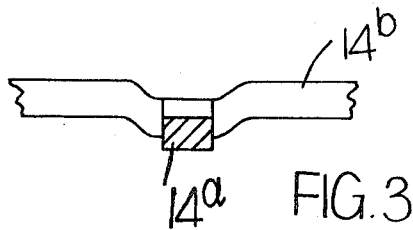
Figure 4:
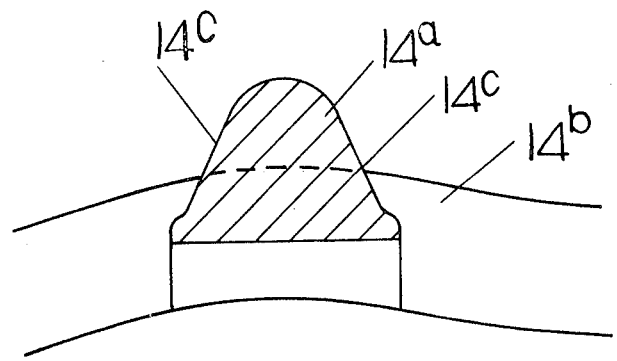
Figure 5:
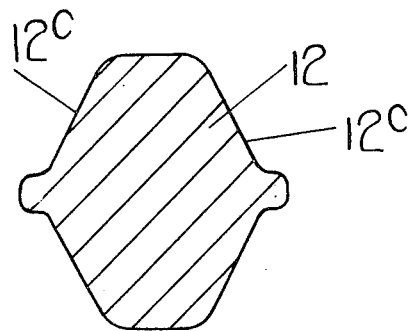

In the accompanying drawings,

FIG. 1 is a plan view of part of a lead battery plate grid manufactured by a method according to a first example of the invention, FIG. 2 is a perspective view to an enlarged scale of part of the grid shown in FIG. 1, FIG. 3 is a sectional view along the line 3—3 in FIG. 2, FIG. 4 is a sectional view similar to FIG. 3 illustrating part of a grid manufactured by a method according to a second example of the invention, and FIG. 5 is a sectional view of a further part of the grid shown in FIG. 4.

Referring to FIGS. 1 to 3 of the drawings, in a first example of the invention it was desired to manufacture a battery plate grid 11 of the form shown in FIG. 1, the grid material being dispersion strengthened lead. As shown in FIG. 1, the grid 11 comprised an open, rectangular frame work with a plurality of parallel ribs 12 extending between a pair of opposite frame members of the grid, one of the frame members being shown at 13. A battery plate lug (not shown) was formed integrally with the grid 11 and the frame work of the grid enclosed a lattice structure defined by a plurality of diagonally extending strands 14, the strands 14 being arranged in first and second sets of parallel strands with the strands 14a of the first set intersecting the strands 14b of the second set to define the lattice.

In one particular example, it was required to produce a finished grid weighing 58 grams and having an overall, effective grid thickness of 0.068 inch. It will be appreciated that the amount of active material which can satisfactorily be supported by the grid is determined by the overall, effective grid thickness, which, in turn is equivalent to the distance, as measured perpendicular to the plane of the grid, between the uppermost point on the grid and the lowermost point on the grid. To manufacture the required grid, a plain strip of the grid material was initially blanked to produce a preformed grid (not shown), having the same weight as the required finished grid, and having a rectangular framework of substantially the same dimensions as that of the finished grid. In this particular example, the blanking operation produced a preformed grid weighing 58 grams in which the frame members, the strands and the ribs each were of rectangular cross section and each had a thickness as measured perpendicular to the plane of the preformed grid, of 0.041 inch. The width of the preformed grid was 4.5 inches and the length of the preformed grid, excluding the lug, was s 4.75 inches. The ribs and the strands of the preformed grid had a width of 0.050 inch, therebeing 4 ribs extending in parallel, spaced relationship with the lateral frame members of the preformed grid. The strands of the preformed grid were arranged in a similar manner to that shown in FIG. 1 with the strands of a first set crossing the strands of a second set to define a lattice. The interstices of the lattice as defined by the strands were substantially diamond-shaped with the minor diagonal of each interstice being 0.317 inch in length and forming the common base of two triangles each having an apex angle of 60°.

The preformed grid was then placed between tools which displaced the portions of the first set of parallel strands 14a intermediate the points of intersection of the strands in one direction perpendicular to the plane of the grid, while at the same time displacing the portions of the second set of parallel strands 14b intermediate said points of intersection in the opposite direction, whereby the finished grid had the undulating appearance shown in FIGS. 2 and 3. In this way, the overall thickness of the preformed grid as measured between the outermost surfaces of the strands 14a, 14b was increased to the required value of 0.068 inch. Thus the finished grid was able to support a volume of 17.38 c.c. of active material, without the material extending beyond the confines of the lattice, as compared with a value of 8.93 c.c. obtained with the preformed grid, which was of course of the same weight as the finished grid.

In a modification of the above example, the blanking operation to produce the preformed grid described above was carried out on a strip of grid material which had been pre-shaped to define one pair of parallel frame members of the preformed grid, the pre-shaped frame members being of substantially rectangular cross section with a thickness of 0.068 inch and a width of 0.100 inch. Subsequent processing of the preformed grid was then carried out in the same manner as described above.

In a second example, as shown in FIGS. 4 and 5, the tools used to perform the displacing operation on the strands of the pre-formed grid described above were arranged to perform a coining operation on the strands and the ribs of the preformed grid, as well as the displacing operation on the strands. The coining operation re-shaped the ribs and the strands from the rectangular configuration exhibited in the preformed grid so that, in the finished grid, the strands 14 were of substantially triangular cross section with the apex of each triangular strand projecting out of the plane of the grid, whereas each rib 12 was of substantially rhomboidal cross section with one diagonal extending perpendicular to the plane of the grid. Then in the finished grid, by virtue of the shape of the ribs and strands, the mutually inclined surfaces 12c, 14c of the ribs and strands respectively defined keying regions which, in use, served to retain the active material of the battery plate within the interstices of the lattice.

It is to be appreciated that by using the method of the invention it is possible to produce a grid which will support a larger volume of active material than could be retained by a grid of the same weight when produced by conventional techniques. Further, it is to be noted that other grid materials than the dispersion strengthened lead described above could be used with the present method, such as for example lead-antimony and lead-calcium alloys.

We claim:

1. A method of manufacturing a battery plate grid of the kind including an open, rectangular conductive framework, a conductive battery plate lug integral with the framework, a plurality of parallel ribs extending between a pair of opposite frame members of the grid, and a plurality of strands arranged to define a lattice structure bounded by the framework, the interstices of the lattice structure in use receiving electro-chemically active material, the method including the steps of:
   a. blanking a strip of grid material to produce a preformed grid and having the same weight as the of finished grid having a rectangular framework substantially the same dimensions as that of the finished grid, the preformed grid also including a lattice structure defined by first and second sets of parallel strands and arranged so that the dimensions of the lattice structure in a direction perpendicular to the plane of the preformed grid are less than the corresponding dimensions of the lattice structure of the finished grid, and
   b. displacing the strands of the preformed grid so as to impart relative movement to the first and second sets of strands respectively in a direction away from each other and perpendicular to the plane of the preformed grid, said dimensions of the lattice structure thereby being increased to the value required in the finished grid.

2. A method as claimed in claim 1 wherein, the strands of said first set are inclined at an angle to the strands of the second set and intersect the strands of the second set to define the interstices of the lattice structure of the preformed grid, and wherein the displacing operation imparts relative movement between the two sets of strands in the portions thereof intermediate the points of intersection of the strands.

3. A method as claimed in claim 1 wherein the displacing of the strands is also accompanied by a coining operation to shape the strands to produce keying regions thereon which in use, serve to facilitate retention of the active material of the battery plate within the interstices of the lattice structure.

4. A method as claimed in claim 1 wherein the grid material which is subjected to the blanking operation is in the form of a plain strip of material.

5. A method as claimed in claim 1 wherein the grid material which is subjected to the blanking operation is pre-shaped so as to define the ribs and/or one pair of parallel frame members of the preformed grid.

6. A method as claimed in claim 1 wherein the grid material is dispersion strengthened lead or a lead alloy.

7. A method as claimed in claim 3 wherein the coining operation also shapes the ribs of the preformed grid so as to produce keying regions on the ribs.

* * * * *